(12) United States Patent
Zheng et al.

(10) Patent No.: US 8,806,451 B2
(45) Date of Patent: Aug. 12, 2014

(54) MONAD BASED CLOUD COMPUTING

(75) Inventors: Zijian Zheng, Bellevue, WA (US); Shengquan Yan, Issaquah, WA (US); Peng Yu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 452 days.

(21) Appl. No.: 13/161,787

(22) Filed: Jun. 16, 2011

(65) Prior Publication Data

US 2012/0324455 A1 Dec. 20, 2012

(51) Int. Cl.
*G06F 9/45* (2006.01)
*G06F 17/30* (2006.01)
*G06F 7/00* (2006.01)
*G06F 9/46* (2006.01)

(52) U.S. Cl.
USPC ........... 717/136; 717/116; 707/713; 707/737; 718/101; 718/102

(58) Field of Classification Search
CPC ............. G06F 17/30; G06F 8/30; G06F 8/41; G06F 8/51–8/52; G06F 9/443
See application file for complete search history.

(56) References Cited

U.S. PATENT DOCUMENTS

| | | | | |
|---|---|---|---|---|
| 6,240,406 B1 * | 5/2001 | Tannen | | 1/1 |
| 7,392,509 B2 | 6/2008 | Sinha et al. | | |
| 7,593,923 B1 * | 9/2009 | Mazzagatti et al. | | 1/1 |
| 7,634,777 B2 * | 12/2009 | Dievendorff et al. | | 719/315 |
| 7,730,079 B2 * | 6/2010 | Meijer et al. | | 707/760 |
| 7,730,462 B2 * | 6/2010 | Grieskamp et al. | | 717/136 |
| 7,779,020 B2 * | 8/2010 | Grust et al. | | 707/760 |
| 7,793,264 B2 * | 9/2010 | Finley et al. | | 717/127 |
| 8,051,427 B2 * | 11/2011 | Kleban | | 719/310 |
| 8,380,700 B2 * | 2/2013 | Moon et al. | | 707/713 |
| 8,392,922 B2 * | 3/2013 | Toub et al. | | 718/101 |
| 8,595,213 B2 * | 11/2013 | Schaefer et al. | | 707/713 |
| 2003/0145308 A1 * | 7/2003 | Geisinger | | 717/114 |
| 2003/0167261 A1 * | 9/2003 | Grust et al. | | 707/3 |
| 2005/0086218 A1 * | 4/2005 | Auspitz et al. | | 707/3 |
| 2005/0166181 A1 * | 7/2005 | Grieskamp et al. | | 717/114 |
| 2006/0167865 A1 * | 7/2006 | Andrei | | 707/4 |
| 2006/0225057 A1 * | 10/2006 | Geisinger | | 717/143 |
| 2007/0027849 A1 * | 2/2007 | Meijer et al. | | 707/3 |
| 2007/0050348 A1 * | 3/2007 | Aharoni et al. | | 707/4 |
| 2008/0216064 A1 * | 9/2008 | Braswell | | 717/149 |
| 2009/0077543 A1 * | 3/2009 | Siskind et al. | | 717/136 |
| 2009/0172036 A1 * | 7/2009 | Marx | | 707/104.1 |
| 2009/0249310 A1 | 10/2009 | Meijer et al. | | |
| 2010/0131556 A1 * | 5/2010 | Meijer et al. | | 707/771 |

(Continued)

OTHER PUBLICATIONS

Grust et al., How to Comprehend Queries Functionally, published by Journal of Intelligent Information systems 12, 1999, pp. 191-218.*

(Continued)

*Primary Examiner* — Tuan Q. Dam
*Assistant Examiner* — Zheng Wei
(74) *Attorney, Agent, or Firm* — Nicholas Chen; David Andrews; Micky Minhas

(57) ABSTRACT

Systems and methods are provided for using monads to facilitate complex computation tasks in a cloud computing environment. In particular, monads can be employed to facilitate creation and execution of data mining jobs for large data sets. Monads can allow for improved error handling for complex computation tasks. Monads can also facilitate identification of opportunities for improving the efficiency of complex computations.

16 Claims, 9 Drawing Sheets

(56) References Cited

U.S. PATENT DOCUMENTS

| | | | |
|---|---|---|---|
| 2010/0169116 A1* | 7/2010 | Marx | 705/2 |
| 2012/0072442 A1* | 3/2012 | De Smet et al. | 707/769 |
| 2012/0095750 A1* | 4/2012 | Meijer et al. | 704/9 |
| 2012/0159459 A1* | 6/2012 | Turner et al. | 717/138 |
| 2013/0103715 A1* | 4/2013 | Beckman et al. | 707/770 |
| 2013/0159969 A1* | 6/2013 | Meijer et al. | 717/116 |
| 2013/0198235 A1* | 8/2013 | Boldyrev et al. | 707/783 |

OTHER PUBLICATIONS

Schroder et al., Generic Exception Handling and the Java Monad, published by Springer-Verlag, Berlin, Heridelberg 2004, pp. 443-459.*

Philip Wadler, Comprehending monads, published by Math. Struct. in Comp. Science (1992), vol. 2, pp. 461-493, Cambridge University Press.*

Robert Ayres, The Functional Data Model as the Basis for an Enriched Database Query Language, published by Journal of Intelligent Information system 12, pp. 139-164 (1999).*

Gottlob et al., Monadic Queries over Tree-Structured Data, published by IEEE 2002, pp. 1-14.*

Marlow, et al., "A Monad for Deterministic Parallelism", Published on: Mar. 24, 2011, Available at: http://community.haskell.org/~simonmar/papers/rnonad-par.pdf, pp. 1-12.

Epstein, et al., "Haskell for the Cloud", Published on: Mar. 24, 2011, Available at: http://research.microsoft.com/en-us/um/people/simonpj/papers/parallel/remote.pdf, pp. 1-12.

Bolour, Azad, "Monads through Pictures", Retrieved on: Apr. 7, 2011, Available at: http://www.bolour.com/papers/monads-through-pictures.html, pp. 1-12.

"Grappling with Monads", Retrieved on: Apr. 7, 2011, Available at: http://blog.lab49.com/archives/231, pp. 1-6.

"Applicative-What? Functor-Who?", Retrieved on: Apr. 7, 2011, Available at: http://wxfz.wordpress.com/2010/03/26/applicative-what-functor-who/, pp. 1-8.

"TESLA: Democratizing the Cloud", Retrieved on: Apr. 7, 2011, Available at: http://www.code-magazine.com/Article.aspx?quickid=0712182, pp. 1-3.

* cited by examiner

MONAD BASED CLOUD COMPUTING

BACKGROUND

Advances in processor and network capabilities have increased the capabilities of using multiple processors working in parallel to perform complex computing tasks. This type of parallel processing can sometimes be referred to as "cloud computing." By distributing complex tasks across many processors, the overall time to complete a complex task can be reduced. Unfortunately, the ability to use parallel resources also means that if a complex task is described incorrectly, or if the parallel implementation of the task is done poorly, a large amount of resources can be used inefficiently before the error in task construction is detected.

SUMMARY

In various embodiments, systems and methods are provided for using monads to facilitate complex computation tasks in a cloud computing environment. In particular, monads can be employed to facilitate creation and execution of data mining jobs for large data sets. Monads can allow for improved error handling for complex computation tasks. Monads can also facilitate identification of opportunities for improving the efficiency of complex computations.

This Summary is provided to introduce a selection of concepts in a simplified form that are further described below in the Detailed Description. This Summary is not intended to identify key features or essential features of the claimed subject matter, nor is it intended to be used as an aid, in isolation, in determining the scope of the claimed subject matter.

BRIEF DESCRIPTION OF THE DRAWINGS

The invention is described in detail below with reference to the attached drawing figures, wherein.

DETAILED DESCRIPTION

Overview

Figure 1:
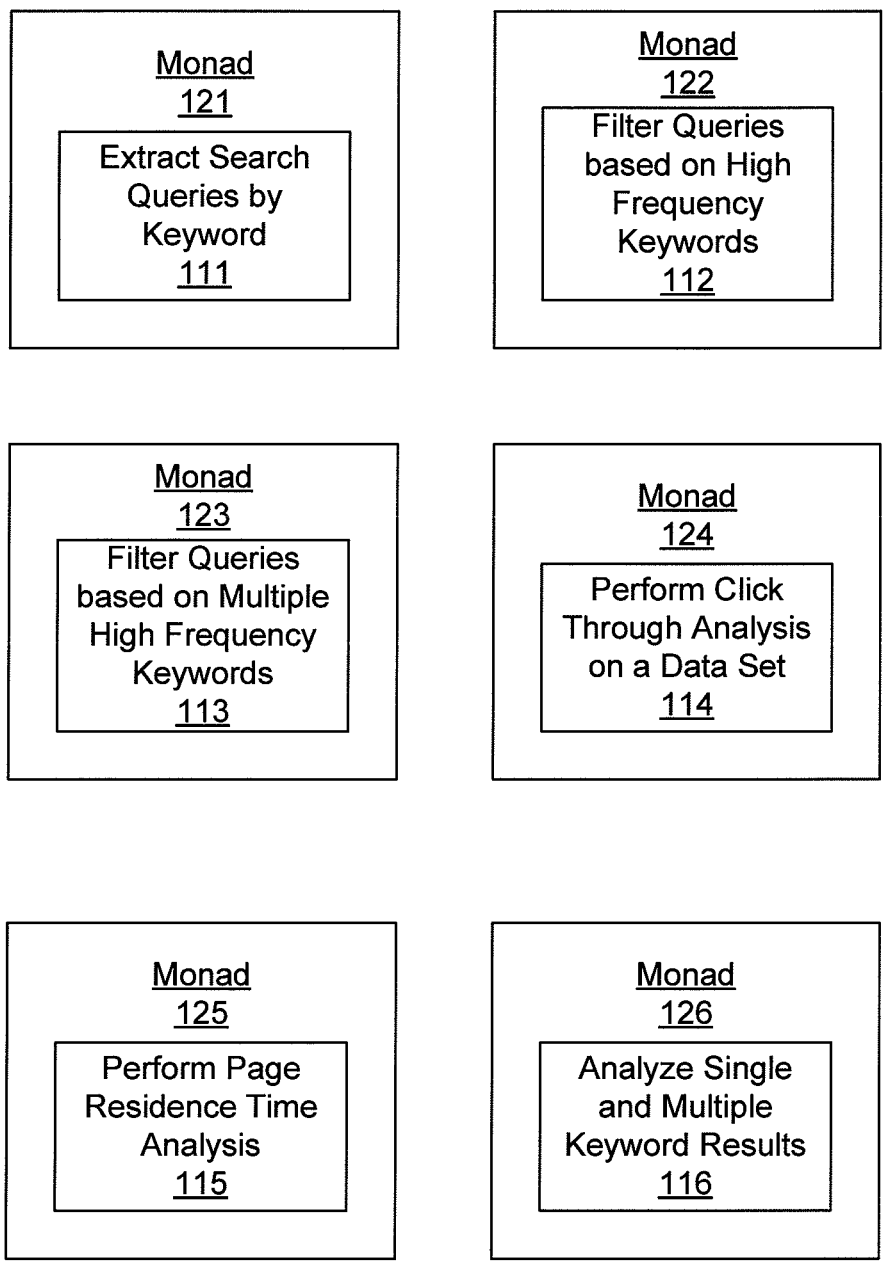
FIG. 1 schematically shows examples of monad wrappers for various functions.

In various embodiments, systems and methods are provided for using monads to facilitate complex computation tasks in a cloud computing environment. In particular, monads can be employed to facilitate creation and execution of data mining jobs for large data sets. Analyzing information related to queries submitted to a search engine, as well as corresponding user interaction with documents returned as responsive to the query, can be an example of data mining on a large data set.

Data mining for large data sets can require a large number of related tasks. The data for the large data set can be obtained or accumulated, possibly from multiple sources having different data formats. The data can then be cleaned in order to extract the information desired for data mining from the various data formats. The information can then be sorted or placed in a catalog, so that information of various types can be found in an expected location. One or more types of analysis can then be performed on the sorted data. For large data sets, each data processing/transforming/analyzing operation can take several hours using a large number of computers.

In order to achieve a desired set of results, multiple types of analysis on a set of data may be required. For example, it may be desirable to perform one or more time series analysis operations, one or more frequency type analysis operations, and one or more clustering analysis operations on a data set to achieve a desired set of outputs. These operations, possibly in the form of modules, can be arranged in a proper order to achieve a result and then submitted together as a job. Unfortunately, assembling all of these operations correctly can be a tedious task that is prone to errors. Some errors can be due to human errors, where a job is assembled incorrectly. Other errors can be resource errors, where a processor assigned to a task fails unexpectedly. Regardless of the source of an error, such an error can stall performance of the complex analysis job, which can potentially lead to loss of several hours of computing time for a large number of processors. A user assembling a job can attempt to build in error handling actions into a job, but this can require substantial additional work on the part of the user.

Still another difficulty in assembling a job for data mining can be related to creating a job that will become parallel in an effective manner. A portion of creating an effective parallel job for data mining of a large data set can be related to dividing a repetitive task performed on the large data set over a plurality of processors. This type of parallelization can be handled directly by a variety of known parallelization algorithms. A more difficult type of parallelization can be related to identifying locations within a long computational flow where a given calculation is repeated for the same data set more than once. For example, a first set of computations may be required for a frequency analysis on a data set. A second set of computations may be required for a different frequency analysis. A third set of computations may be required for a clustering analysis. Although each type of analysis is distinct, there can be locations in each set of computations where a given function is applied to the same data set. Conventionally, each set of computations can be performed without reference to the other sets, resulting in the repeated calculation on the data set being performed three times. However, if the repeated calculations can be identified in advance, the common calculations could be saved and/or applied to each relevant location. Instead of performing the common calculations multiple times, a calculation can be performed once and a data lookup used to provide the data for the remaining instances of the common calculation.

Monad structures can be used to facilitate assembling jobs for data mining. A monad can serve as a wrapper for various levels in a job workflow. As an example, a series of basic tasks involved in data mining can be written in a conventional relational programming language. This can be a general programming language such as SQL or the SCOPE scripting language that can be used for handling parallel jobs in the Cosmos parallel operating environment. Alternatively, the basic tasks can be in a language built upon a procedure language, such as C++ or C#. A monad wrapper can allow a job to be assembled using a functional programming language, such as "Haskell" or "F#", even though the underlying job modules are written in a relational language. For example, some monads can be used to transform basic data manipulation/analysis tasks from a relational language to the functional language formulation of a monad. Other monads can be used to construct more complex calculation tasks from the basic transformed functions. Still other monads can be used to provide wrappers with error handling and/or status check capabilities for a function or a monad. Yet other monads can be job monads that can be used to assemble a series of tasks into a pipeline monad. Combining these various types of monads can allow for creation of more robust data mining jobs. Instead of having a job that fails when one step in a long pipeline fails, the monad wrappers can provide functionality to attempt to fix errors. Monads can also be used to improve the efficiency of calculations performed using monads as wrappers.

A monad is a type construction that can encapsulate an underlying type system and amplify it by adding features particular to the monad. Two monads can be combined using a bind operation. Though the bind operator, the underlying type of the first monad can be exposed and a second monad encapsulating another underlying type can be constructed. It is in the bind operation that the amplified behavior can be activated and executed. Note that the amplification can be hidden from Monad users because the aspects of the underlying type are preserved throughout the computation. A bind operation can similarly be used to bind a non-monad value or function to a monad value or function.

By definition, a Monad type must follow three axioms:
(1) Left identity: return a>>=f≡f a
(2) Right identity: m>>=return≡m
(3) Associativity: (m>>=f)>>=g≡m>>=(\x→f x>>=g)

In the above, the "return" function refers to the return function from a language like Haskell, where performing return on a value generates the corresponding value in a monad type. Equation 1 specifies that binding a value of a first (identity) monad type to a monad function of a second type is equivalent to performing the monad function of the second type on the first value. Equation 2 specifies that the return function can behave like a neutral element or identity element for monads. Equation 3 specifies that binding two functions in succession can be the same as binding one function that is determined from the two functions.

A monad design can be used to encapsulate an execution unit (job) that runs in a cloud computing system. In a cloud computing system like Cosmos, a job can be wrapped into a monad computation M<Job>. When a job is wrapped, the monad can amplify the job with extra features, such as an execution environment (virtual cluster, priority), inputs/outputs, and states. For example, binding a job to a monad wrapper can amplify the behavior of the job so that the job can be automatically submitted again with retry if the job fails. Other types of behavior amplification can include job monitoring, data monitoring, and state context updating. Similarly, data uploading and downloading can be encapsulated into IO monads. Using this approach, the cloud computing environment can be treated as a large CPU and different monad tasks can be threaded together to create a computation flow. The computation flow itself can be wrapped into a monad to create data processing pipelines and/or high volume data analysis tasks with a declarative style. This can provide an advantage over a script language that follows relational algebra, as a relational algebra type declaration typically creates a static execution plan during compile time. The relational language can make it difficult to write control flow logic, such as branching and iteration logic, that is common for data process or analysis algorithms. With the computation flow monad, the control flow can be naturally accommodated during monad composition in a modern functional programming language such as Haskell or F#. Thus, a monad approach can seamlessly leverage local computing concepts, such as control flow logic, and cloud computing resources, such as a multiprocessor data processing unit, to achieve automation.

One application example of the computation flow monad can be a design for a Cosmos data processing job with an automatic error recovery. In this example, a monad is provided to handle a situation referred to as "user skew". This is a situation that can occur during analysis of data from a search engine log for data that is sorted on a per user basis. Typically, the number of entries from a single user can be a number that is small relative to any relevant data size in the data analysis. Thus, the number of entries from a typical single user can be small relative to the total size of the data file, small relative to the size of data chunks distributed to various processors involved in the data analysis, and/or small relative to some other characteristic size associated with the computing environment or the data analysis. However, some users within a search engine data log can represent "skew" users that have a number of entries that is appreciable relative to the total size of the log file. Such skew users often represent a spam user or another type of unwanted data, such as data corresponding to some type of error.

For skew users that represent a spam type user, the skew users can sometimes be identified in advance. Data corresponding to such users can then be discarded during data processing, which can prevent difficulties with data analysis. However, skew users that are not known ahead of time are often not detected until data analysis has started. At this point, a data analysis job has likely been initiated, with processing distributed over multiple processors. The individual processors may be able to identify the presence of data corresponding to a skew user, but the individual processors do not necessarily have the capability to adapt to the change in data. Instead, the data processing job must typically be restarted, without the presence of the skew user data.

When creating a job to handle the data processing, a user can use a conventional relational language to provide the error checking necessary to handle a skew user and automatically restart a job. However, developing this error checking and applying it appropriately to each job can be time consuming. Instead, a monad type can be used to handle this type of error checking. Using a monad type wrapper for a job, a user submitting a job does not need to include skew user error checking explicitly for each job. Instead, the monad type wrapper can be developed once, and then used to wrap desired jobs from the user that would benefit from skew user error checking.

The following pseudo-code provides an example of a possible computation flow monad:

```
let searchMerge date = computation{let! job = processSearchMergeJob date
if failed(job) && failure_reason(job)=UserSkew
    let! deleteSkewedUser = processRemoveSkewedUserJob date
    // Retry the job here.
    return! processSearchMergeJob date
else return job}
```

Note that processSearchMergeJob is a function of DateTime→JobMonad. And the type of JobMonad is of (CosmosVC, DatabaseContext)→Job. CosmosVC refers to a virtual cluster environment that the job will be executed in. In other embodiments, virtual cluster environments other than a Cosmos environment can be used instead. When the JobMonad is executed, the execution engine feeds the Monad with CosmosVC as a parallel processing environment and DatabaseContext as a current location and state of a database (or other data source) for the data mining job. In the above pseudo-code, if a job fails based on a status corresponding to a skew user error, the identified skew user data can be removed from the data set. The monad may then submit a new parallel processing job depending on whether or not the job was already executed. The state of whether the job was already executed can be determined by querying the database for the job state. This new submission of the job can occur automatically, without requiring user intervention. In the above function, the logic for handling job submission, database query and database state updating are all hidden in the bind operator. This converts determining the logic for job submission, database queries, and database states from tasks for the job designer to tasks for the monad designer. Note that the parameters for making the function calls to handle the skewed user situation do not need to be known to the job designer. Instead, the job designer can focus on the control flow for handling the skewed user case in a straightforward manner.

More generally, use of monad types can facilitate error handling as various types of error handling can be stacked using monads for performing the error handling. In the example above, the monad wrapper for handling a skew user does not fundamentally alter the nature of the type "job" of the underlying process. As a result, multiple monads that operate on type "job" can be stacked, with each monad being able to recognize that the underlying type being operated on is type "job" or type "Monad<job>". This can simplify error handling for a job designer, as the job designer does not need to focus on the order for performing various types of error checking, or the input and output states of error checking modules. Instead, the job designer can focus on selecting the various types of error handling that are desired for a given job.

In addition to error handling, monads can be used to facilitate determining the state of a job. With monadic functions, the state of a job can become a parameter that is associated with the monad corresponding to the job.

Another application for a monadic design can be for creation and use of complicated data mining algorithms. During data mining, many of the tasks can be designed and/or built up from building blocks for data analysis. The building block algorithms can be transformed into computation monads, which can then be further composed or stacked to create additional computation monads corresponding to higher level data analysis tasks. This approach can eventually converge to a language-oriented solution for large scale data analysis in the cloud.

An example of pseudo-code for a sample data analysis is shown below:

```
let myAnalysis = computation
{
    let! stream = uploadIO "table in database"
    let! job = kmeans stream numOfClusters //
        Note: kmeans is a computation flow that wraps kmeans
        algorithm
    do! downloadIO job.OutputStream[0] //
        Note: this downloads the results data to local database
}
```

In the example pseudo-code, kmeans represents a monad wrapper for a corresponding algorithm. The pseudo-code provides an overall monad for identifying a data source, performing a job on the data, and sending the output to a local database. Similar to the situation for the monads for error handling, monads for data processing can be stacked and/or serialized as is convenient for performing a job. One requirement for stacking of monads can be that when a first monad receives a second monad as a parameter, the monad type of the second monad should be recognized by the first monad as the desired monad (or data) type.

Example of Creating a Complete Job from Monad Wrappers

The following provides a schematic example of using monads to convert commands from a relational language to a descriptive language. The monads can allow a user to perform higher level data mining tasks based on monad wrappers that abstract or hide lower level details. The following data mining tasks are intended as examples, as use of monads can be applied generally to a variety of data mining tasks.

In this example, a user can construct a data mining job using monads. The goal of the data mining job in this example is to perform two types of data mining analysis on data from search engine logs. One type of analysis can be an analysis to improve document relevance for documents that may be responsive to search queries that include multiple high frequency keywords. In search queries received by search engines, some keywords may appear in received search queries with a frequency above a threshold value. The frequency of keyword appearance can be determined in any convenient manner, such as a keyword that is received in a search query more than a threshold number of times per day, or a keyword that is received in a search query more than a threshold number of times per thousand search queries, or a keyword that is received in more than a threshold percentage of all received search queries.

In addition to identifying queries with a single high frequency keyword, queries containing pairs of high frequency keywords can also be identified. After identifying queries with pairs of high frequency keywords, the highest ranking ten results for the queries with pairs of high frequency keywords can be identified. The click through rates and/or page view times for documents selected based on the queries can also be identified. In this analysis, a combination of click through rate and page view time for the resulting page can be used as a proxy for document interest by a user submitting a search query. The click through rate and page view times for the query with multiple high frequency keywords can be analyzed in comparison with click through rates and page view times for queries containing only one of the high frequency keywords. The goal of the analysis can be to determine whether users combining more than one high frequency keyword are primarily interested in documents associated with one of the keywords, or whether the grouping of multiple high frequency keywords represents a user intent different from the individual keywords.

A second type of data mining can be used to investigate regional differences in the use of high frequency keywords. Queries containing high frequency keywords can be identified. The identified queries can then be sorted into various regions or locations. The regions can correspond to any convenient geographic area, such as a zip code, a city, a state, or an arbitrary geographic region. The click through rates and/or page view times can then be analyzed on a per region basis, to determine if any location based or regional based factors should influence the document rankings.

The above data analysis tasks can be performed by building up an overall data mining workflow computation from a series of smaller tasks. First, smaller tasks for performing the multiple high frequency keyword analysis can be identified. The tasks described here can describe a computation level and/or monad level that is still relatively high compared to basic functions. This high level of abstraction is used for convenience here to illustrate the concept. One example of identifying smaller tasks, shown in FIG. 1, can be to have a task for extracting search queries by keyword 111. Another task can be filtering the extracted search queries 112 to keep queries containing a high frequency keyword. Still another task can be identifying queries 113 with more than one high frequency keyword. Yet another task can be to perform a click through analysis 114 on a data set. The click through analysis 114 can be performed on the queries containing a high frequency keyword, or on the identified queries containing multiple high frequency keywords. For documents that are clicked in response to a query, a page residence time analysis 115 can also be performed. Again, this can be performed on the data set for all queries with high frequency keywords, or on the data set for queries with multiple high frequency keywords. Still another task can be to compare the click through and page residence data 116 for queries with multiple high frequency keywords with the corresponding data for the individual high frequency keywords.

Each of the above tasks can represent a "building block" function that is wrapped by a monad. The smaller tasks can then be combined together using another monad to form the overall data analysis task. Note that the list of tasks presented here is intended only to provide an example of the operation of the invention. In another embodiment, the above list of smaller tasks may be broken down into building block tasks at a still lower level of abstraction. In such an embodiment, the above list of tasks could correspond to higher level computation tasks that are constructed from assembly of monads corresponding to transformed functions and/or other lower level monads.

FIG. 1 shows an example of the organization of monads for performing an analysis related to queries containing multiple high frequency keywords. In FIG. 1, tasks 111-116 represent programs or scripts in a relational language for performing a data analysis task. Monads 121-126 represent corresponding wrappers to convert or transform the relational language functions into functional language functions. In FIG. 1, all of the relational language functions shown can be considered as being at the lowest level of abstraction. In other embodiments, relational language functions at various levels of abstraction can be used. Thus, the exact computation level for use of a monad containing transformed relational language function can vary depending on the task contained in the function.

Figure 2:
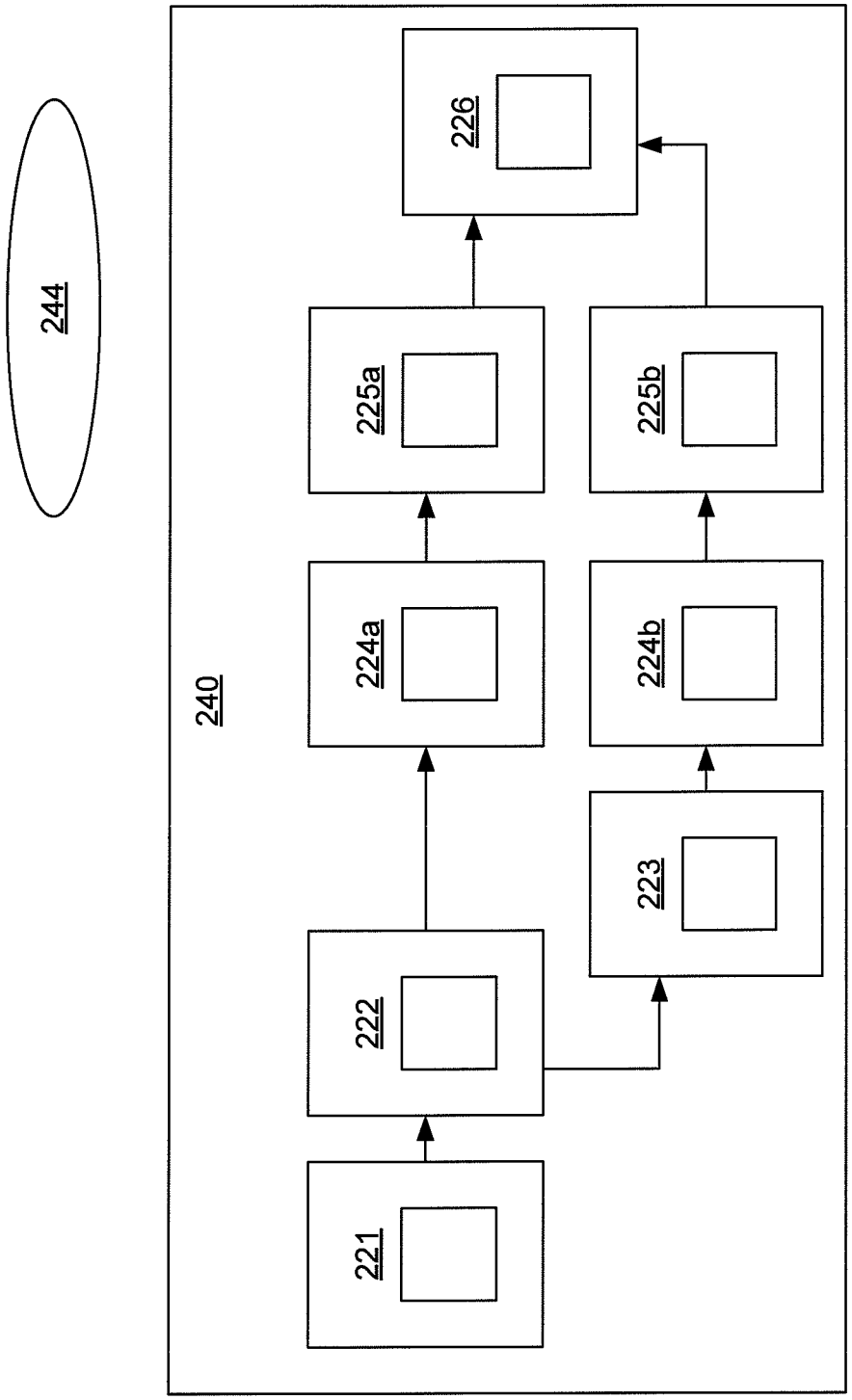
FIGS. 2-4 schematically show construction of higher level tasks from lower level functions or monad functions.

Based on the building block monads 121-126, the desired data analysis task can be constructed as shown in FIG. 2. In FIG. 2, data analysis monad 240 represents a monad for performing the analysis on queries with multiple high frequency keywords. The input data set for monad 240 is shown as a data set 244. Data set 244 can represent, for example, data from one or more search logs that has been filtered to remove known spam or other unwanted queries. The data set 244 can further represent a data set that has been formatted into a desired input format. Thus, data set 244 can potentially represent data from a variety of search log sources that may or may not share an original common format. The sequence of assembled building block monad instances used to form data analysis monad 240 are also shown in FIG. 2. Monads 221-226 correspond to instances of monads 121-126, respectively. Note that monads 224a and 224b represent a building block monad function (124 in FIG. 1) used to operate on the different data sets corresponding to all queries with high frequency keywords (224a) and queries with multiple high frequency keywords (224b). Monads 225a and 225b have as similar relationship to monad 125. The monad 240 in FIG. 2 represents a computation monad built or constructed from one lower layer of monads 221-226. The level below monads 221-226 corresponds to the underlying functions in the relational language, as shown in FIG. 1. In other embodiments, a computation monad 240 can be constructed by assembling multiple layers of computation monads into a desired computation.

A similar task breakdown can be provided for the analysis of queries containing a high frequency keyword on a regional basis. One example can be to have a task for extracting search queries by keyword. Another task can be filtering the extracted search queries to keep queries containing a high frequency keyword. Still another task can be filtering queries based on locations associated with the queries. Yet another task can be to perform a click through analysis on a data set. The data sets can correspond to the queries that have been filtered based on location. For documents that are clicked in response to a query, a page residence time analysis can also be performed. The statistics for the various regions can then be compared.

Figure 3:
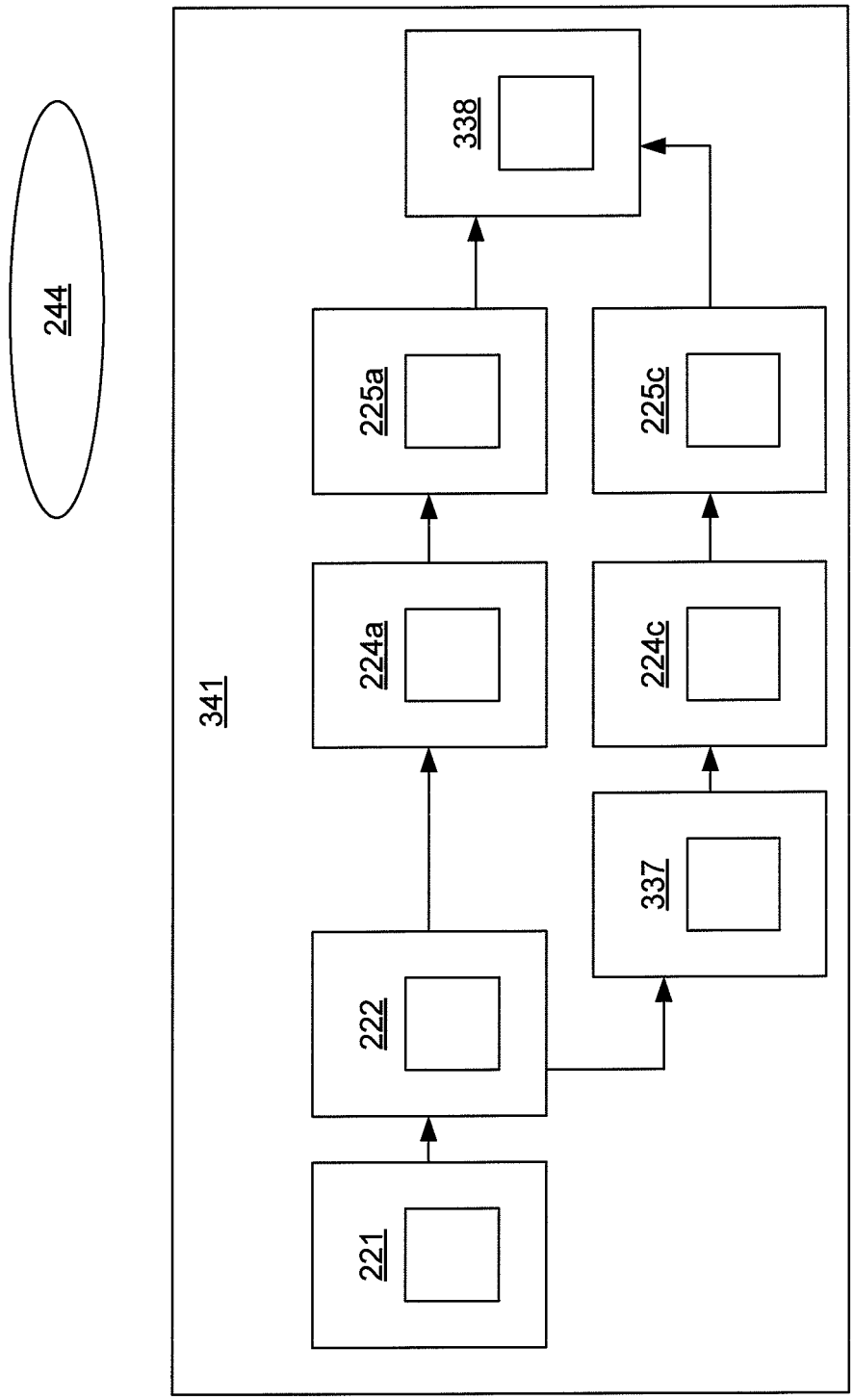

FIG. 3 shows an example job monad 341 for performing the regional analysis on queries with high frequency keywords. In FIG. 3, the analysis is performed on the same data set 244. The data analysis task in FIG. 3 includes monads 221, 222, 224a and 225a. New monads 337 and 338 are also required for the regional analysis specific portions of the task. New monads 337 and 338 can represent monads for transforming additional functions from a relational language to a monad form, as was depicted generally in FIG. 1. Monad 337 corresponds to a function for separating query information based on geographic identifiers. Monad 338 provides a function for comparing the regional analysis date for the keywords with the overall analysis. Monads 224c and 225c can represent one or more monads for performing the click through and page residence analysis on the various regional data sets that are generated by monad 337. It is noted that tasks 221, 222, 224a, and 225a are shared in common between monad 341 and monad 240.

Figure 4:
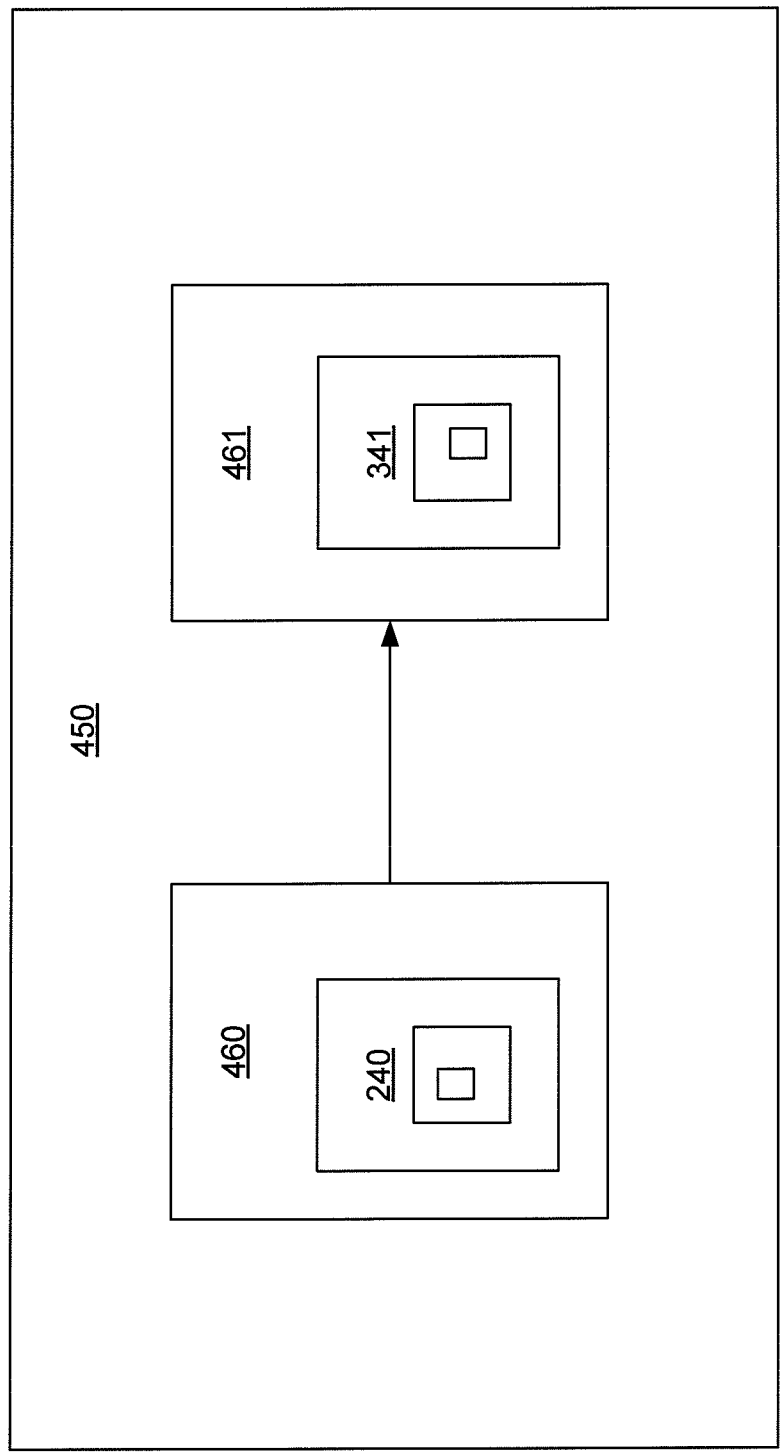

FIG. 4 shows an example overall job monad 450 for submitting a job based on monads 240 and 341. An intermediate level of error handling monads 460 and 461 can be used between job monad 450 and workflow task monads 240 and 341. Alternatively, error handling can be incorporated directly into job monad 450 if desired. As shown in FIG. 4, the error handling level of monads 460 and 461 can include several types of error handling functions, including functions for handling skew users and processor failures in a cloud computing environment.

Because overall job monad 450 includes monads 240 and 341, the monad structure can allow additional opportunities for job efficiency to be identified. As noted above, monads 221, 222, 224a, and 225a are called in both monad 240 and monad 341 using the same data sets. Because a monad in a functional language performs operations on an as-needed basis, the monad structure can allow these repeated calculations to be identified automatically. When job 450 is submitted to a cloud computing environment, the output from these identified calculations can be saved or stored, so that the functions in monads 221, 222, 224a, and 225a are performed only once. It is noted that the repeated calculations can be located in any level of abstraction of the monad structure. For example, relative to the top monad calculation level, the repeated calculations can be located two or more levels below the top monad calculation level, or five or more levels below, or ten or more levels below, or twenty or more levels below. As a result, once a monad structure has been developed for the basic building blocks of data mining jobs, a user does not have to identify locations of common calculations from within a myriad of possible combinations within a data mining job. Instead, the common calculations can be identified automatically.

Having briefly described an overview of various embodiments of the invention, an exemplary operating environment suitable for performing the invention is now described. Referring to the drawings in general, and initially to FIG. 5 in particular, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, and the like. The invention may also be practiced in distributed computing environments where tasks are performed by remote-processing devices that are linked through a communications network.

Figure 5:
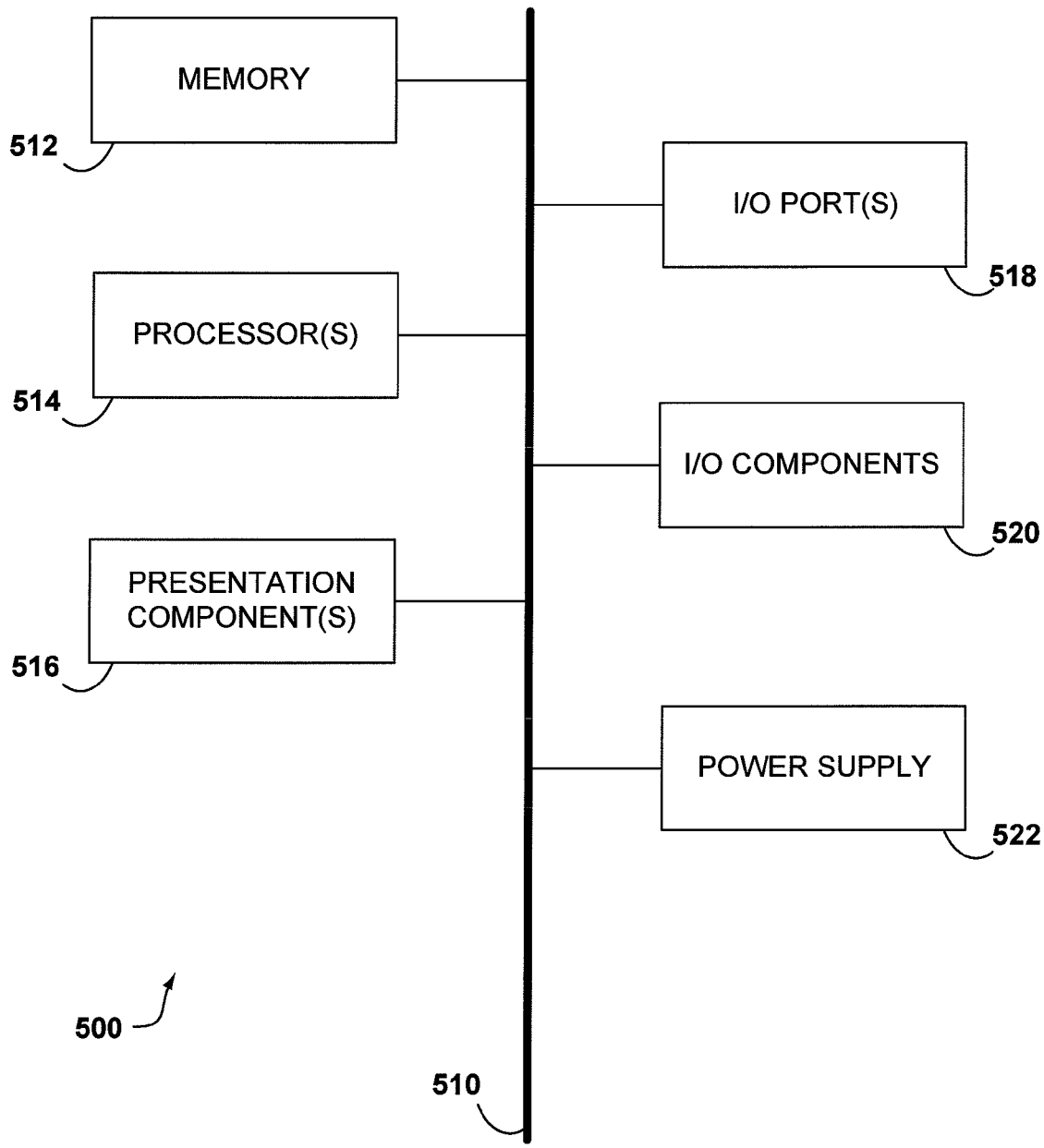
FIG. 5 is a block diagram of an exemplary computing environment suitable for use in implementing embodiments of the present invention.

With continued reference to FIG. 5, computing device 500 includes a bus 510 that directly or indirectly couples the following devices: memory 512, one or more processors 514, one or more presentation components 516, input/output (I/O) ports 518, I/O components 520, and an illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 5 and reference to "computing device."

The computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, Random Access Memory (RAM), Read Only Memory (ROM), Electronically Erasable Programmable Read Only Memory (EE-PROM), flash memory or other memory technology, CD-ROM, digital versatile disks (DVD) or other holographic memory, magnetic cassettes, magnetic tape, magnetic disk storage or other magnetic storage devices, or any other medium that can be used to encode desired information and which can be accessed by the computing device 500. In an embodiment, the computer storage media can be selected from tangible computer storage media. In another embodiment, the computer storage media can be selected from non-transitory computer storage media.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The memory 512 can include computer-storage media in the form of volatile and/or nonvolatile memory. The memory may be removable, non-removable, or a combination thereof. Exemplary hardware devices include solid-state memory, hard drives, optical-disc drives, etc. The computing device 500 includes one or more processors that read data from various entities such as the memory 512 or the I/O components 520. The presentation component(s) 516 present data indications to a user or other device. Exemplary presentation components include a display device, speaker, printing component, vibrating component, and the like.

The I/O ports 518 can allow the computing device 500 to be logically coupled to other devices including the I/O components 520, some of which may be built in. Illustrative components can include a microphone, joystick, game pad, satellite dish, scanner, printer, wireless device, etc.

Figure 6:
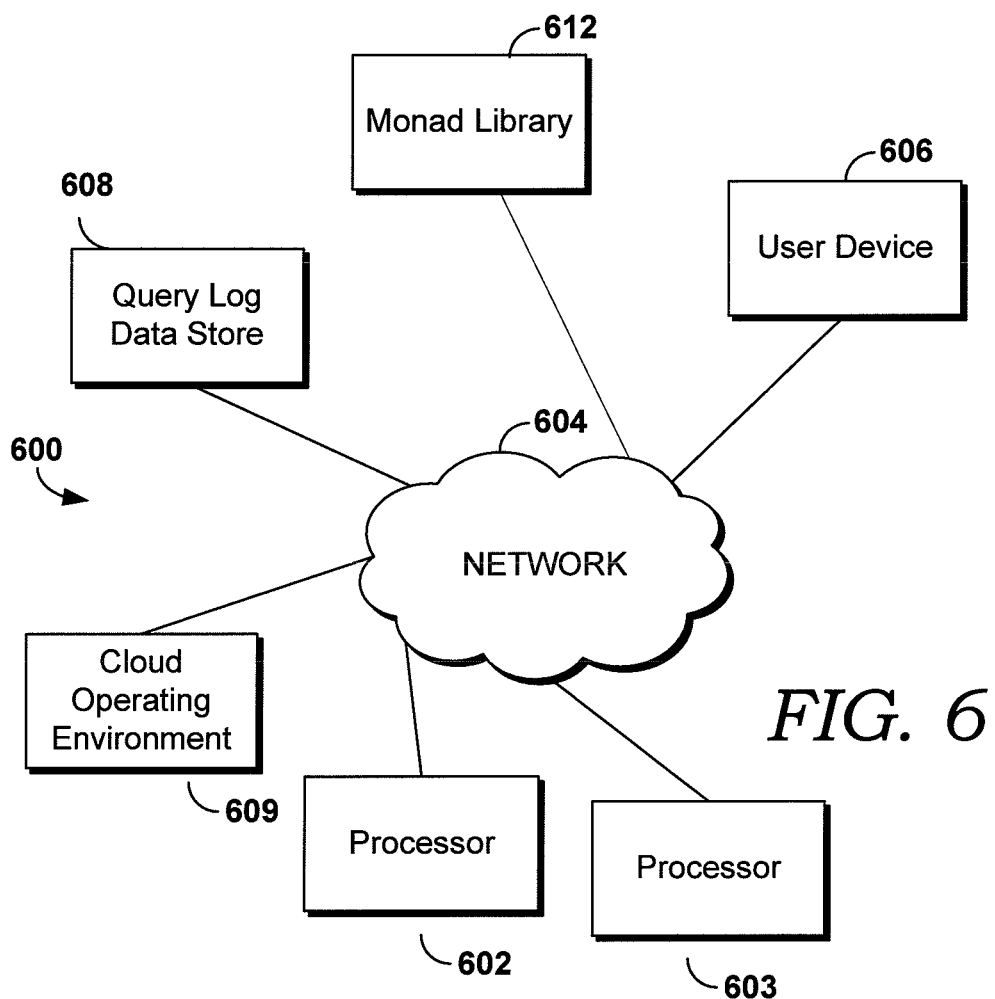
FIG. 6 schematically shows a network environment suitable for performing embodiments of the invention.

With additional reference to FIG. 6, a block diagram depicting an exemplary network environment 600 suitable for use in embodiments of the invention is described. The environment 600 is but one example of an environment that can be used in embodiments of the invention and may include any number of components in a wide variety of configurations. The description of the environment 600 provided herein is for illustrative purposes and is not intended to limit configurations of environments in which embodiments of the invention can be implemented.

The environment 600 includes a network 604, a user device 606, a query log data store 608 and a monad library 612. The environment also includes a processors 602 and 603 which are part of the cloud computing resources that can be accessed by jobs run using cloud operating environment 609. The network 604 includes any computer network such as, for example and not limitation, the Internet, an intranet, private and public local networks, and wireless data or telephone networks. The user device 606 can be any computing device, such as the computing device 500, from which a search query can be provided. For example, the user device 606 might be a personal computer, a laptop, a server computer, a wireless phone or device, a personal digital assistant (PDA), or a digital camera, among others. In an embodiment, a plurality of user devices 606, such as thousands or millions of user devices 606, can be connected to the network 604. Similarly, processors 602 and 603 are representative of any number of processors that could be connected by a network 604 for use in a parallel or cloud computing environment. Optionally, one or more of processors 602 or 603 could be a user device as well. Cloud operating environment 609 represents an operating system or interface that allows a user to submit jobs for execution in the environment.

Query log data store 608 can represent one or more databases or other data storage structures that contain query log information that can be targeted for data mining. The data in query log data store 608 can originally be based on one or more types of search engine interfaces. A user can use monad library 612 to construct higher level tasks using building block functions in order to process data based on query log data store 608. The tasks can range from initial cleaning and formatting of search log data of various types to performing analysis of the data within the data store. Alternatively, query log data store 608 can be replaced by any other convenient type of data store with data that is suitable for data mining applications.

Additional Examples

Figure 7:
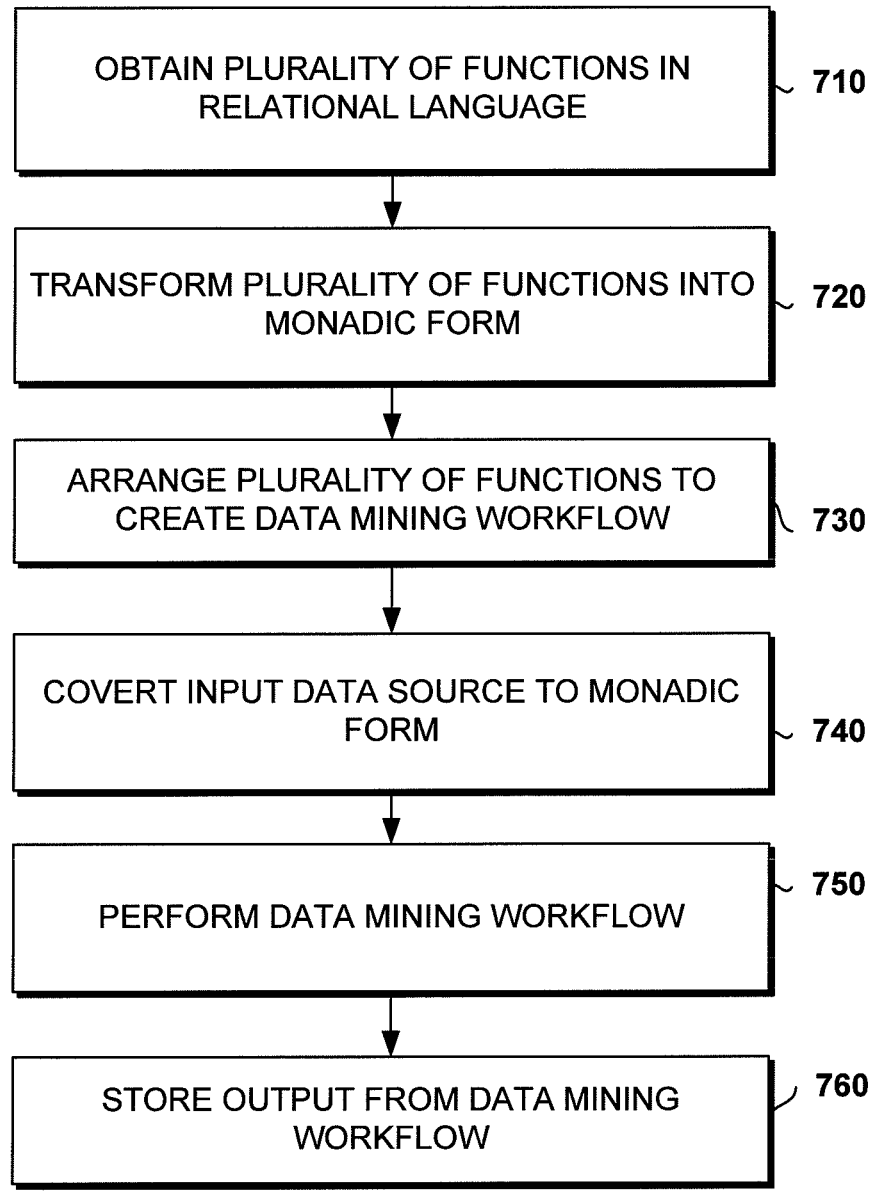
FIGS. 7-9 schematically show examples of methods according to some embodiments of the invention.

FIG. 7 schematically shows an example of a method according to an embodiment of the invention. In the method shown in FIG. 7, plurality of functions in a relational language can be obtained 710. The plurality of functions can be transformed 720 to monadic form. The plurality of functions can be arranged 730 to create a data mining workflow. An input data source can be converted 740 to a monadic form. The data mining workflow can be performed 750. Optionally, this can include identifying a workflow computation that is repeated in a plurality of monads within the data mining workflow; performing a single instance of the repeated workflow computation to generate an output from repeated workflow computation; and associating the output from the repeated workflow computation with the plurality of monads containing the repeated workflow computation. The output from the data mining workflow can then be stored 760.

Figure 8:
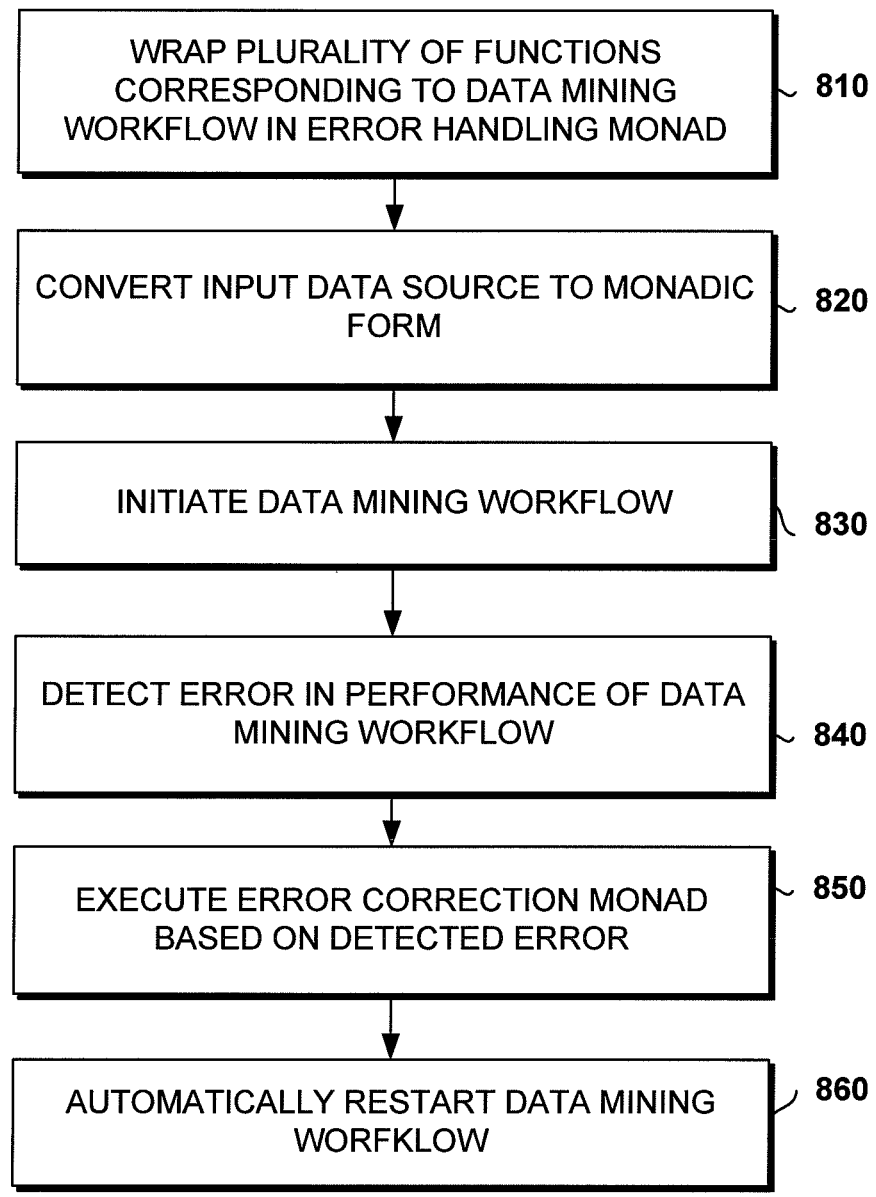

FIG. 8 schematically shows another example of a method according to an embodiment of the invention. The method can include wrapping 810 a plurality of functions corresponding to a data mining workflow in an error handling monad. An input data source can be converted 820 to a monadic form. The data mining workflow can be initiated 830. An error in performance of the data mining workflow can be detected 840. An error correction monad can be selected based on the detected error and executed 850. The data mining workflow can then be automatically restarted 860.

Figure 9:
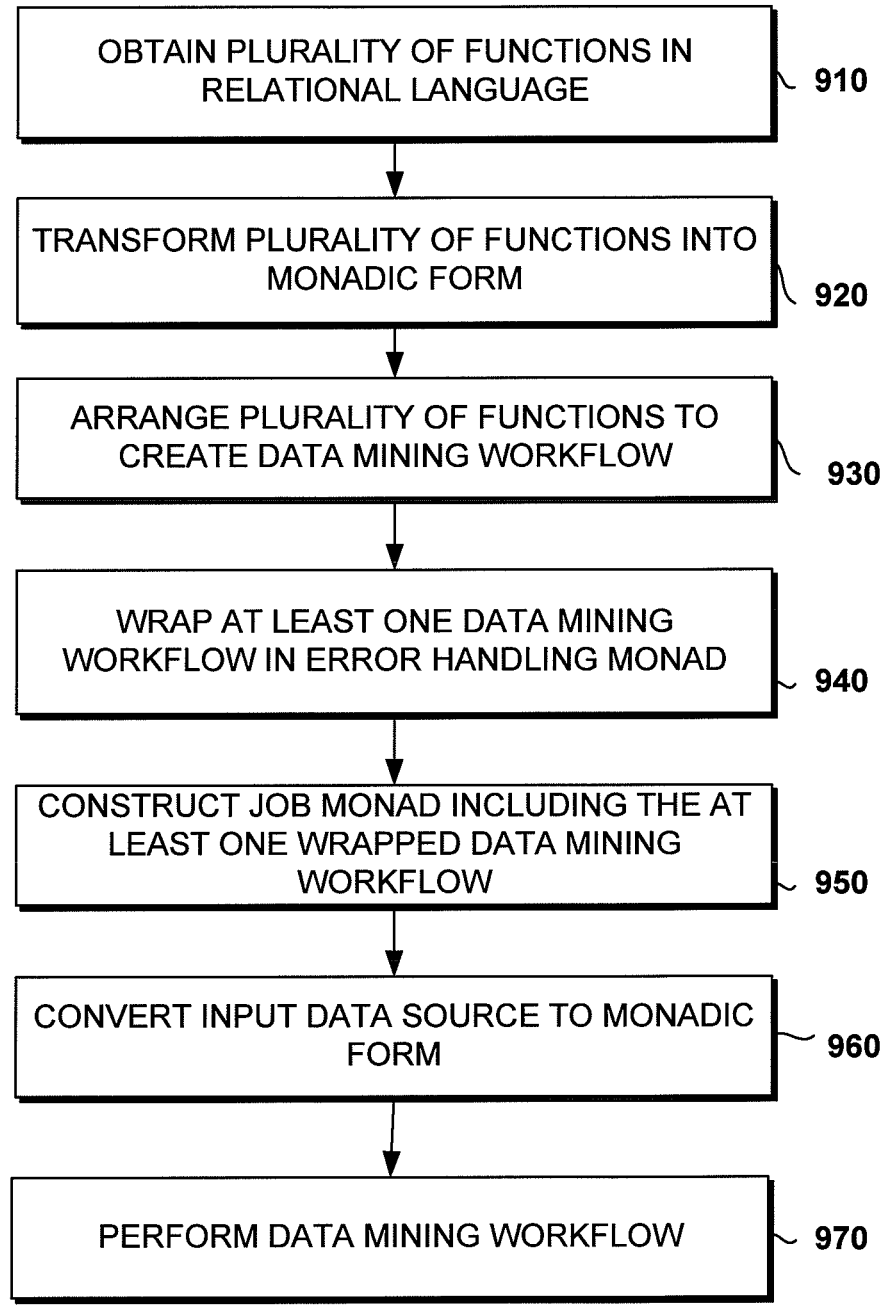

FIG. 9 schematically shows another example of a method according to an embodiment of the invention. In FIG. 9, a plurality of functions in a relational language can be obtained 910. The plurality of functions can be transformed 920 to monadic form. The plurality of functions can be arranged 930 to create one or more data mining workflows. At least one data mining workflow can be wrapped 940 in an error handling monad. A job monad including the wrapped at least one data mining workflow can be constructed 950. An input data source can be converted 960 to a monadic form. The data mining workflow can be performed 970. Similar to the flow diagram shown in FIG. 7, this output can be stored.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

In an embodiment, one or more computer-storage media storing computer-useable instructions can be provided that, when executed by a computing device, perform a method for using monads to facilitate data mining tasks. The method can include obtaining a plurality of functions in a relational language; transforming the plurality of functions to monadic form; arranging the plurality of functions to create a data mining workflow; converting an input data source to a monadic form; performing the data mining workflow; and storing the output from the data mining workflow. In some embodiments, performing the data mining workflow can include identifying a workflow computation that is repeated in a plurality of monads within the data mining workflow; performing a single instance of the repeated workflow computation to generate an output from repeated workflow computation; and associating the output from the repeated workflow computation with the plurality of monads containing the repeated workflow computation.

In another embodiment, one or more computer-storage media storing computer-useable instructions can be provided that, when executed by a computing device, perform a method for using monads to facilitate data mining tasks. The method can include wrapping a plurality of functions corresponding to a data mining workflow in an error handling monad; converting an input data source to a monadic form; initiating the data mining workflow; detecting an error in performance of the data mining workflow; executing an error correction monad based on the detected error; and automatically restarting the data mining workflow.

In still another embodiment, one or more computer-storage media storing computer-useable instructions can be provided that, when executed by a computing device, perform a method for using monads to facilitate data mining tasks. The method can include obtaining a plurality of functions in a relational language; transforming the plurality of functions to monadic form; arranging the plurality of functions to create one or more data mining workflows; wrapping at least one data mining workflow in an error handling monad; constructing a job monad including the wrapped at least one data mining workflow; converting an input data source to a monadic form; performing the data mining workflow; and storing the output from the data mining workflow.

From the foregoing, it will be seen that this invention is one well adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims.

What is claimed is:

1. One or more computer-storage media storing computer-useable instructions that, when executed by a computing device, perform a method for using monads to facilitate data mining tasks, comprising:
    obtaining a plurality of functions in a relational language;
    transforming, by a processor, the plurality of functions to monadic form;
    arranging the plurality of transformed function monads to create a data mining workflow;
    converting an input data source to a monadic form;
    performing, by a processor, the data mining workflow on the converted input data source, including
        identifying a workflow computation that is repeated in a plurality of transformed function monads within the data mining workflow, the workflow computation being performed on at least a portion of the converted input data source;
        performing a single instance of the repeated workflow computation on the at least a portion of the converted input data source to generate an output from repeated workflow computation; and associating the output from the repeated workflow computation with the plurality of transformed function monads containing the repeated workflow computation; and storing the output from the data mining workflow.

2. The computer-storage media of claim 1, wherein a plurality of workflow computations are identified that are repeated in more than one transformed function monad.

3. The computer-storage media of claim 1, wherein the data mining workflow comprises calculations corresponding to at least one of a frequency analysis, a time-series analysis, and a cluster analysis.

4. The computer-storage media of claim 1, wherein the data mining workflow comprises calculations corresponding to at least two of a frequency analysis, a time-series analysis, and a cluster analysis.

5. The computer-storage media of claim 4, wherein the output from the repeated workflow calculation is associated with transformed function monads in portions of the workflow for generating the at least two of a frequency analysis, a time-series analysis, and a cluster analysis.

6. The computer-storage media of claim 1, wherein arranging the plurality of transformed function monads to create a data mining workflow comprises arranging one or more computation levels of monadic functions, wrapping the one or more computation levels in an error handling monad level, and wrapping the error handling monad level in a job monad level.

7. The computer-storage media of claim 1, wherein arranging the plurality of transformed function monads to create a data mining workflow comprises constructing one or more computation monads containing a plurality of transformed function monads, and arranging the computation monads to form the data mining workflow.

8. The computer-storage media of claim 1, wherein at least one first computation monad is constructed using a second computation monad.

9. A method for using monads to facilitate data mining tasks, comprising:
   obtaining a plurality of functions in a relational language;
   transforming, by processor, the plurality of functions to monadic form;
   arranging the plurality of transformed function monads to create one or more data mining workflows;
   wrapping at least one data mining workflow in an error handling monad;
   constructing a job monad including the wrapped at least one data mining workflow;
   converting an input data source to a monadic form;
   performing, by a processor, the data mining workflow on the converted input data source, the performing of the data mining workflow comprising:
      identifying a workflow computation that is repeated in a plurality of transformed function monads within the wrapped at least one data mining workflow, the workflow computation being performed on at least a portion of the converted input data source;
      performing a single instance of the repeated workflow computation on the at least a portion of the converted input data source to generate an output from repeated workflow computation; and
      associating the output from the repeated workflow computation with the plurality of transformed function mounds containing the repeated workflow computation; and
   storing the output from the data mining workflow.

10. The method of claim 9, wherein the wrapped at least one data mining workflow comprises calculations corresponding to at least two of a frequency analysts, a time-series analysis, and a cluster analysis.

11. The method of claim 9, further comprising:
   detecting, by the error handling monad, an error in performance of the data mining workflow;
   executing an error correction monad based on the detected error; and
   automatically restarting the data mining workflow.

12. The method of claim 11, further comprising obtaining a completion status for the data mining workflow prior to automatically restarting the workflow.

13. The method of claim 11, wherein the data mining workflow is initiated by executing a job monad containing a plurality of data mining workflows.

14. The method of claim 9, wherein transforming the functions to a monadic form comprises wrapping the functions in a monad that include at least one additional type of error handling.

15. The method of claim 9, further comprising arranging the plurality of functions to create the data mining workflow into one or inure computation levels of monadic functions.

16. The method of claim 15, wherein arranging the plurality of functions to create a data mining workflow comprises combining the transformed plurality of functions to construct one or more computation monads containing a plurality of transformed function monads, and arranging the computation monads to form the data mining workflow.

\* \* \* \* \*